Aug. 30, 1966 W. L. SHELTON 3,269,499

SPEED RESPONSIVE COIL CLUTCH WITH EDDY CURRENT PILOT BRAKE

Filed Oct. 21, 1964

INVENTOR.
WINSTON L. SHELTON
BY
HIS ATTORNEY ated August 30, 1966

3,269,499
SPEED RESPONSIVE COIL CLUTCH WITH EDDY CURRENT PILOT BRAKE
Winston L. Shelton, Jeffersontown, Ky., assignor to General Electric Company, a corporation of New York
Filed Oct. 21, 1964, Ser. No. 405,395
1 Claim. (Cl. 192—81)

This invention relates to clutch mechanisms and, more particularly, to a variable speed clutch of the wound-spring type.

An object of this invention is to provide an improved clutch of the wound-spring type.

Another object of this invention is to provide such a clutch which provides a continuously variable output speed.

Another object of this invention is to provide such a clutch in which the output speed is electrically controlled.

A further object of this invention is to provide such a clutch in which the output speed is magnetically controlled.

In carrying out this invention, in one form thereof, I provide a rotary driving structure and an adjacent, rotary driven structure. A wound-spring clutch is mounted on the driving structure and the driven structure to operatively connect these structures. In order to provide a continuously variable output speed, I provide a rotary control structure which is connected to one end of the wound-spring clutch. A variable strength electro-magnet is arranged to induce eddy currents in the control structure to thereby adjust the force or torque exerted on the wound-spring clutch by the control structure. This alters the speed at which the wound-spring clutch will slip on the driving structure and thereby alters the output speed of the clutch mechanism.

The subject matter which I regard as my invention is particularly pointed out and distinctly claimed in the concluding portion of the specification. My invention, however, both as to organization and method of operation, together with further objects and advantages thereof, may best be understood by reference to the following description, taken in conjunction with the accompanying drawing.

Figure 1:
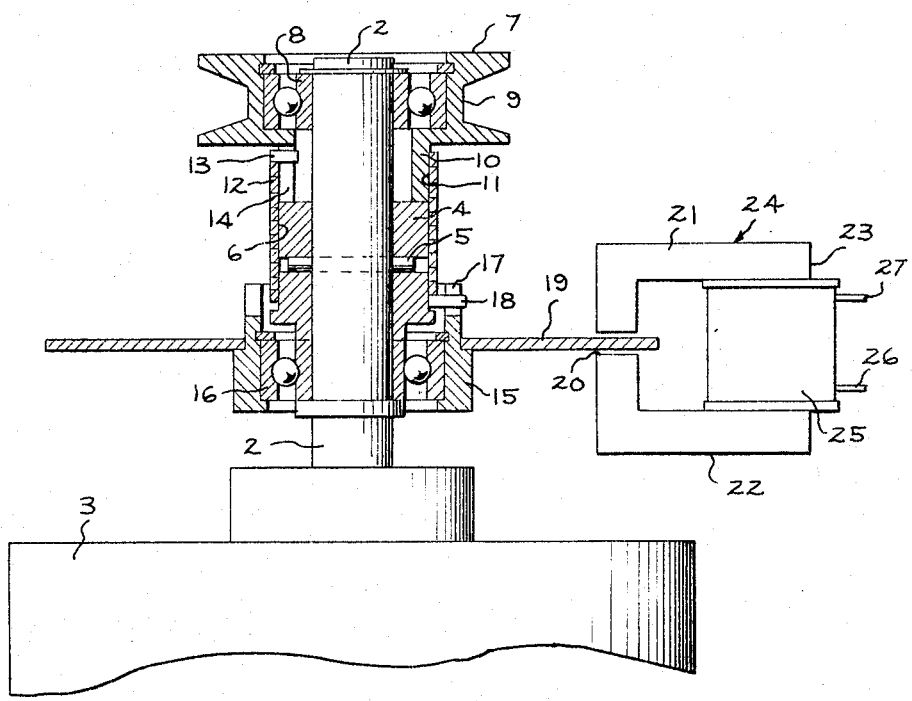
Figure 2:
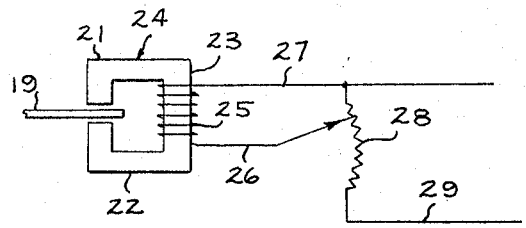
Figure 3:
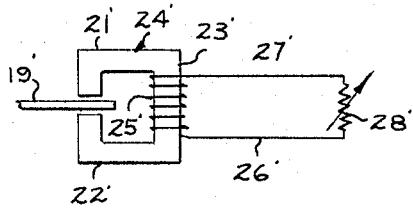

In the drawing:
FIGURE 1 is a sectional view of a clutch mechanism constructed in accordance with my invention;
FIGURE 2 is a schematic representation of the electrical control circuit utilized with the clutch mechanism; and
FIGURE 3 is a schematic representation of the electrical control circuit of another embodiment of my invention.

Referring now to the drawing, there is shown a wound-spring clutch mechanism 1 including a rotary input shaft 2 connected to a suitable source of power such as electric motor 3. An elongated driving hub 4 is mounted intermediate the ends of shaft 2 by means of a pin 5 which extends through mating openings in the hub and shaft. Hub 4 is formed with a generally cylindrical outer surface 6.

An output or driven structure 7 is mounted on shaft 2 adjacent hub 4 by means of a bearing 8 received between the shaft 2 and output structure 7 so that the output structure is free to rotate relative to the shaft. In the particular embodiment shown, the output structure is formed to include a pulley portion 9 for transfer of movement from the clutch mechanism, although it will be obvious that any other suitable transfer structures may be utilized. A cylindrical sleeve 10 extends from pulley 9 and terminates adjacent one end of hub 4. The outer surface 11 of sleeve 10 is generally cylindrical in shape and has the same diameter as the outer surface 6 of hub 4. A wound-spring clutch 12 is mounted about the outer surfaces 6 and 11 and includes a radially inwardly extending tab 13 which is received in a slot 14 formed in sleeve 10 so that clutch 12 rotates with output structure 7.

When motor 3 rotates shaft 2 and hub 4 in a first direction the friction between outer surface 6 of hub 4 and clutch 12 causes clutch 12 to contract and firmly seize upon outer surfaces 6 and 11 so that driven structure 7 is effectively locked to input shaft 2 so as to rotate therewith. By applying a restraining force to the end of spring 12 mounted around input hubs 4, spring 12 can be caused to loosen so as to slip with respect to hub 4 so that no torque will be delivered to the output structure. This restraining force has a critical value, which may be called the critical restraining torque of the wound-spring clutch. At force values below this critical value, torque is delivered to the output structure while, above this value, no torque is delivered to the output structure. Thus, by a proper selection of operative elements clutch mechanism 1 will have a predetermined operational speed of output structure 7 at which speed spring clutch 12 will slip relative to hub 4.

When motor 3 drives shaft 2 and hub 4 in the opposite direction the friction between outer surface 6 of hub 4 and clutch 12 is such as to cause clutch 12 to tend to expand and slip with respect to hub 4. Therefore, in the second direction of rotation, no movement will be imparted to output structure 7.

If the torque on the wound-spring clutch is varied, the speed which the output structure must obtain in order to reach the critical restraining torque of the clutch will be varied. In order to adjustably vary the restraining torque on wound-spring clutch 12 I provide a control structure in the form of a sleeve 15 which is mounted around shaft 2 by a bearing 16 received between sleeve 15 and shaft 2. One end of sleeve 15 extends over the end of hub 4 remote from output structure 7 and includes a slot 17 which receives a radially outwardly extending tab 18 formed at the end of spring clutch 12 opposite tab 13. Thus, spring clutch 12 is secured to output structure 7 and control structure 15 so that these three elements rotate at substantially the same speed and both output structure 7 and control structure 8 exert a torque load on spring clutch 12.

The restraining torque may be provided by eddy current generator. To this end, the control structure includes a flat plate portion 19 which is secured to sleeve 15 and extends radially outwardly therefrom. Plate portion 19 is received in an air gap 20 formed between a pair of spaced opposed legs 21 and 22 which are joined at their outer end by a base 23 to form a C-shaped core 24. A coil or electric winding 25 is mounted on base 23 and connected by leads 26 and 27 to a source of electrical power (not shown).

By forming plate portion 19 of a conducting material and passing an electric current through coil 25 a magnetic field may be induced across plate portion 19. As the plate portion rotates through the magnetic field, eddy currents are induced in the plate portion. This exerts a force or torque on the plate portion 19 which is a function of the square of the velocity of the plate portion. Thus, the force between hub 4 and control structure 15 is a function of the square of the velocity of the control structure. The force on plate portion 19 also varies linearly with the flux density of the field in plate portion 19, and the flux density in plate portion 11 is proportional to the voltage applied to the coil 25. Thus, by varying the voltage, the restraining torque placed on the wound-spring clutch can be adjusted so that the speed of the output structure 7 and control structure 15 at which the torque on spring clutch 12 is equal to the critical restraining torque of the clutch will be varied.

Referring now to FIGURE 2 there is shown a circuit for applying an adjustable voltage to coil 25. Lead 27 is connected to one side of a source of electrical power (not shown) and lead 26 is connected to the other side of the source of electrical power through a rheostat 28 and lead 29. By adjusting the setting of rheostat 28 the voltage impressed across the coil 25 will be varied. As the voltage impressed across coil 25 is increased the speed of output structure 7 at which spring clutch 12 will reach critical restraining torque and slip with respect to hub 4 will be decreased. Conversely, when the voltage impressed on coil 25 is decreased the speed which output structure 7 will obtain before spring clutch 12 slips with respect to hub 4 will be increased.

While, for ease of illustration, rheostat 28 has been shown as being manually adjustable, an automatic presettable voltage adjusting mechanism could be employed so that clutch mechanism 1 could incorporated in a machine such as an automatic clothes washer to automatically provide different speeds of operation for different portions of the washing cycle.

FIGURE 3 illustrates the control circuit for a magnet control structure similar to the electrical (eddy current) control structure of FIGURES 1 and 2. In FIGURE 3 primes are used to designate elements corresponding to similar elements of FIGURES 1 and 2. Plate portion 19' is formed from a magnetic material such that North and South magnetic poles appear alternately around the circumference of the plate portion 19'. As plate portion 19' rotates between legs 21' and 22' of core 24' voltage is generated in coil 25'. This causes a current to flow through the circuit including coil 25', leads 26' and 27' and rheostat 28'. This current flows in a direction such as to oppose the voltage generated in coil 25' by plate portion 19'. Thus, a force is exerted on plate portion 19' which opposes its movement and the value of this force may be varied by varying the setting of rheostat 28'. Therefore, by varying the setting of rheostat 28' (manually or automatically) the speed of output structure 7 at which the critical restraining torque of spring clutch 12 is reached may be varied.

It will be obvious that a second clutch mechanism, similar to the ones described, could also be attached to output structure 7 and, by utilizing a wound-spring clutch wound in the opposite direction, would provide an adjustable speed control for both directions of motor rotation.

By the present invention I provide a new and improved adjustable speed clutch of the wound-spring type by which a continuously variable output speed may be obtained in an economical and durable manner.

While in accordance with the patent statutes, I have described what, at present, is considered to be the preferred embodiment of my invention, it will be obvious to those skilled in the art that various changes and modifications may be made thereto without departing from the invention and I, therefore, aim in the appended claim, to cover such changes and modifications as fall within the true spirit and scope of my invention.

What I claim as new and desire to secure by Letters Patent is:

A variable speed clutch mechanism including:
(a) an elongated, rotary input shaft,
(b) an elongated driving hub mounted intermediate the ends of said shaft for movement therewith, said hub having a generally cylindrical outer surface,
(c) an output structure mounted around said shaft for rotational movement relative thereto, said output structure having a generally cylindrical outer surface disposed adjacent one end of said outer surface of said hub,
(d) a wound-spring clutch secured to said output structure and engaging said outer surface of said output structure and said outer surface of said hub to effect an operative connection between said hub and said output structure at speeds up to a predetermined speed of said output member, at which speed said spring clutch will slip relative to said hub,
(e) a control structure mounted around said shaft adjacent the other end of said hub for rotational movement relative thereto, one end of said spring clutch being connected to said control structure for movement therewith,
(f) said control structure including a flat plate portion of electrically conductive material extending radially outwardly,
(g) an electro-magnet including a C-shaped core having a base, a pair of spaced opposed legs forming an air gap, and a coil mounted on said base,
(h) said plate portion being received in said air gap with said legs on opposite sides of said plate so that said electro-magnetic induces an eddy current in said plate portion, and
(i) an electrical circuit including a variable resistance connecting said coil to a source of electrical energy to vary the value of the eddy current induced in said plate portion for altering the speed at which said spring clutch slips relative to said outer surface of said hub.

References Cited by the Examiner

UNITED STATES PATENTS

| | | | |
|---|---|---|---|
| 2,052,961 | 9/1936 | Bonham | 192—104 X |
| 2,534,034 | 12/1950 | La Brie | 192—35 |
| 2,964,661 | 12/1960 | Sutherland et al. | 310—93 |
| 2,971,105 | 2/1961 | Jaeschke | 310—93 X |
| 3,006,448 | 10/1961 | Fox | 192—81 |

FOREIGN PATENTS 224,274  11/1924  Great Britain.

DAVID J. WILLIAMOWSKY, *Primary Examiner.*

BENJAMIN W. WYCHE III, *Examiner.*